F. G. WARBURTON.
CONTROLLING MEANS FOR ELECTRIC MOTORS.
APPLICATION FILED FEB. 11, 1915.
1,335,357.
Patented Mar. 30, 1920.
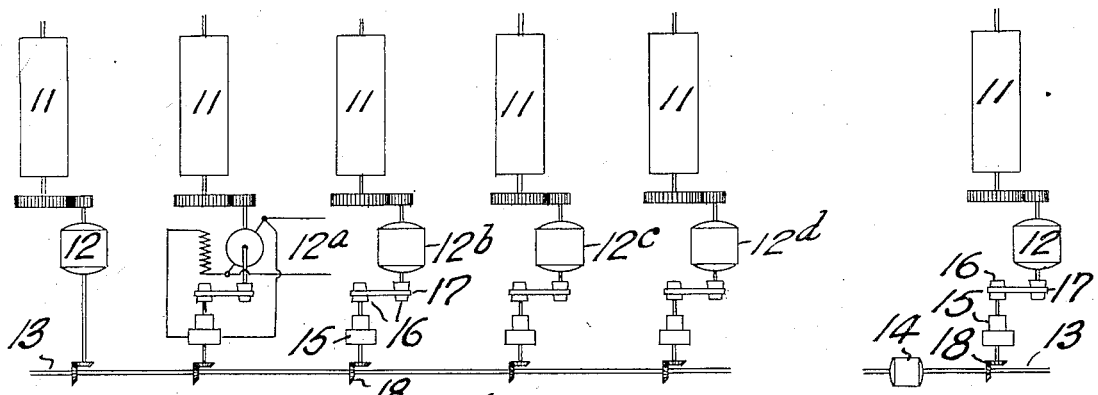
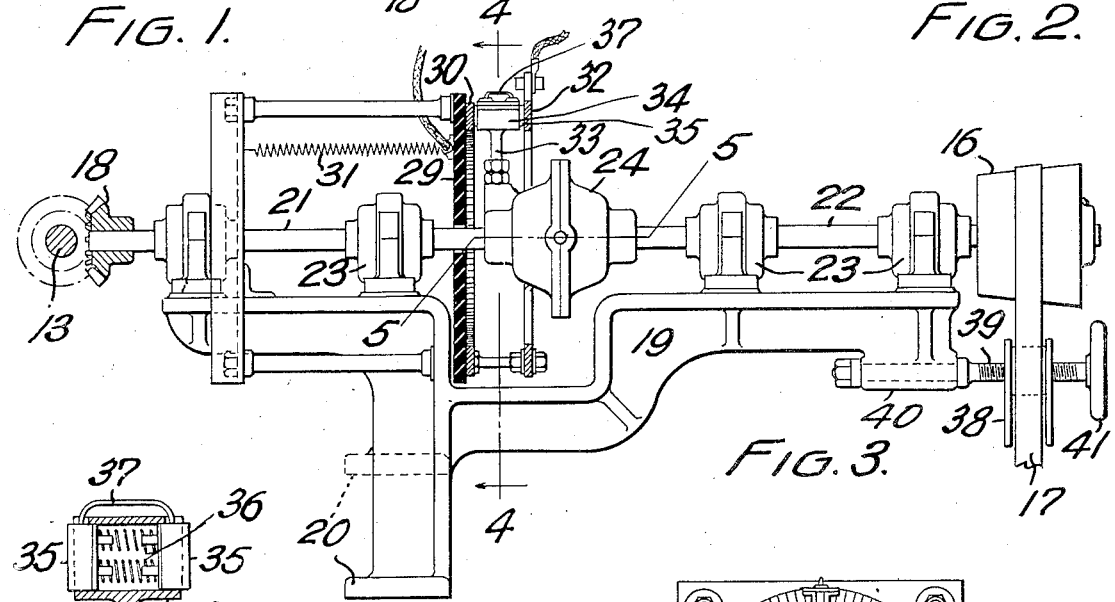
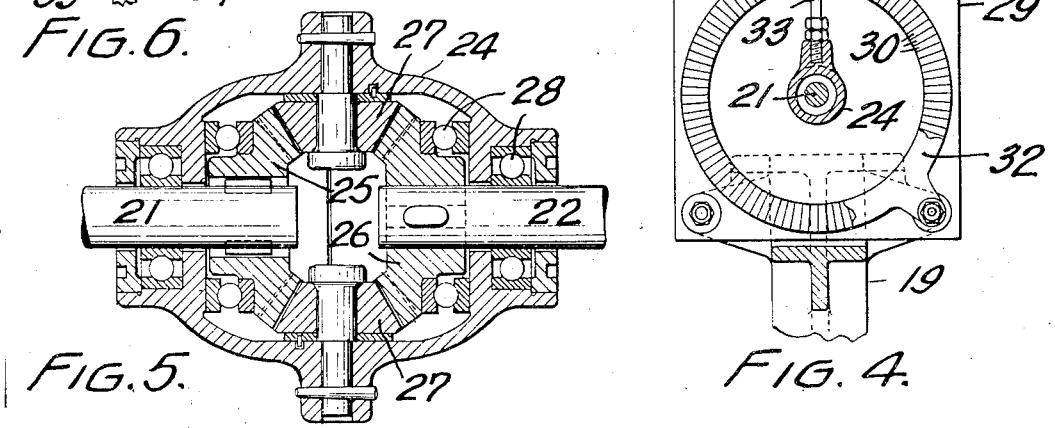
Witnesses
Inventor
F. G. Warburton
By
Attorneys

UNITED STATES PATENT OFFICE.

FRANK G. WARBURTON, OF MONTREAL, QUEBEC, CANADA.

CONTROLLING MEANS FOR ELECTRIC MOTORS.

1,335,357.     Specification of Letters Patent.     Patented Mar. 30, 1920.

Application filed February 11, 1915. Serial No. 7,550.

*To all whom it may concern:*

Be it known that I, FRANK G. WARBURTON, a subject of the King of Great Britain, residing at the city of Montreal, in the Province of Quebec and Dominion of Canada, have invented certain new and useful Improvements in Controlling Means for Electric Motors, of which the following is a full, clear, and exact description.

This invention relates to improvements in controlling means for electric motors, and the object is to provide a simple, efficient and sensitive means for controlling a plurality of motors and maintaining them in uniform speed relation.

A further object is to provide a controlling means particularly adapted for use in connection with motor driven paper making machines, paper and cloth printing and coating machines and the like, and in fact all classes of machinery in which it is desired to maintain various units of the machine driven by separate motors operating in any desired speed relation.

It is a well known fact that if a number of motors of an exactly similar design, except synchronous motors, are connected to different portions of a machine, such as a paper machine, each motor will be differently sensitive to conditions which cause speed changes than others. In some classes of work, where various parts of a machine are driven by separate motors, such a change in the speed relation of the motors is not important, but in other machines such as paper machines, and the like, having a number of motors driving the various parts thereof, it will be readily seen that even a fraction of a per cent. change in the speed relation of the motors must produce disastrous results on the product. Various driving mechanisms have been produced for paper machines and the like by means of which the various rolls may be driven at any desired speed relation, and this relation altered if necessitated by a change in the character of the material operated on. With comparatively few exceptions, these devices have been complicated or otherwise faulty, and while many electric driving devices have been designed, none have been found to meet the practical requirements sufficiently to bring them into general use. The device hereinafter described has been designed with particular regard to the practical requirements of paper and similar machine drives, and has been found by experiment to meet these requirements.

The device consists essentially of a master speed shaft running at any desired speed, which speed can be adjusted. The master speed shaft has driven by it one spur shaft per unit motor to be controlled by regulator, and each motor to be controlled drives a second spur shaft. The master speed spur shaft and the motor spur shaft in each case is set to run at the same speed precisely in revolutions per minute, or any fixed relation if gears are used. Should there be any change in the angular relation of these two unit spur shafts, caused by a tendency to speed change between these spur shafts, such angular change is made to actuate a regulator to correct such a speed change tendency. A manual regulating device is provided for each motor, so that the motors may be set to operate at different predetermined speeds relatively to the master shaft, and will be thereafter automatically retained at this relative speed. If the master shaft runs either faster or slower than normal, all the motors will be automatically regulated a proportionate amount faster or slower, but will retain their predetermined speed relations, so that the only result will be an increased or decreased output of the driven machine.

In the drawings which illustrate the invention:—

Figure 1 is a diagrammatic view of the invention as applied to a paper machine or the like.

Fig. 2 is a diagrammatic view showing a slight variation from Fig. 1.

Fig. 3 is a side elevation of one of the regulating units partly in section.

Fig. 4 is a section on the line 4—4, Fig. 3.

Fig. 5 is a section on the line 5—5, Fig. 3.

Fig. 6 is an enlarged sectional view of the brush.

Referring more particularly to the drawings, 11 designates the rolls of a paper machine or the like, or any driven device, and 12, 12$^a$, 12$^b$, 12$^c$, 12$^d$ designate the motor connected to each, one of which motors is so shown as to indicate the wiring arrangement of a D. C. motor. The first motor of the machine, namely 12, is geared to a master shaft 13, or if desired, the master shaft may be driven by a separate motor 14, (see Fig. 2), and the first motor 12 arranged in every respect like the motors 12$^a$, 12$^b$, etc. A controller designated as a whole by the numeral 15 is provided for each motor, except of course the motor 12 or the motor 14, and is connected to the motor by cone pulleys 16 and belts 17. Each controller is also connected to the master shaft by bevel gears 18. This controller, in common with all others, comprises two relatively movable parts, one of which is connected to the motor and the other to the master shaft, as will be more clearly shown hereafter. It will therefore be seen that if the controller parts connected to the motors operate at exactly the same speed as the controller parts connected to the master shaft, there will be no relative angular movement between these parts provided they revolve in the same direction. A single controller of one type is shown in detail in Fig. 3, and is provided with a frame 19 having a foot 20 arranged in any suitable position for attachment to the motor frame or other support, the position of the foot 20 being arranged according to the position of the support so as to bring the frame into suitable arrangement with the master shaft 13. Shafts 21 and 22 are mounted on the frame in bearings 23. The shaft 21 is driven by the bevel gears 18 from the master shaft 13, while the shaft 22 is driven by the cone pulley mechanism from the motor. These two shafts are arranged axially in line, and their adjacent ends enter a casing 24 and are provided within the casing with bevel gears 25 and 26. The casing carries a suitable number of bevel gears 27 arranged axially perpendicular to the gears 25 and 26 and in mesh with both. This mechanism constitutes the well known differential gear, and according to the laws of differential gears, if the shafts 21 and 22 revolve at the same rate and in opposite directions, the gears 27 will revolve idly and the casing 24 remain stationary. If, however, one shaft revolves faster than the other, the casing revolves in the same direction as the faster shaft, and at a speed equal to half the difference between the speeds of the two shafts. In practice, this differential gear is made quite small and light, so as to absorb practically no power, and is made as nearly frictionless as possible by the use of ball bearings 28 throughout. This feature is taken advantage of in the present invention, and the controller, which is of the variable resistance type, mounted partly on the frame 19 and partly on the casing of the differential. The stationary part of the controller comprises a slab 29 of insulating material carrying contacts 30 and any suitable number of resistance coils 31, of which only one is shown. A stationary ring 32 is also carried by the slab insulated therefrom and spaced away from the contacts. This ring forms one terminal, the other terminal being connected to any suitable part of the resistance. The differential casing 24 is provided with a radially projecting arm 33, having at the end thereof a housing 34 containing a pair of carbon brushes 35 pressed in opposite directions by springs 36, provided with a suitable electric connection 37. One of these brushes 35 is arranged to travel over the contacts, and the other to travel over the terminal ring 32, so that electric connection is thus established. If the motor is rotating at its proper speed, the differential casing is stationary and the brush also stationary, but if the motor runs either slow or fast, the differential casing moves in one direction or the other, and shifts the brush over the contacts, thus increasing or diminishing the amount of resistance in the circuit and regulating the field of the motor, or other equivalent means according to the type of motor used, to bring it to proper speed.

It will be readily understood that by means of this control device, the shafts 21 and 22 must rotate at exactly the same speed. In connection with such machines as paper machines, the motors do not all run at the same speed nor do they run of necessity at the same ratio of speed, under different conditions of manufacture, but require to have the speed ratio changed from time to time according to the kind of material to be made. Some sort of adjustment is therefore necessary between the motor and shaft 22. This adjustment consists of the double cone pulley, shown in Figs. 1 and 3. A very accurate belt shifter of any suitable form is provided for the belt 17. One form which this shifter may take is shown in Fig. 3, and consists of a belt engaging member 38, mounted on a screw threaded spindle 39 revolubly mounted in an extension 40 of the frame 19 and held against longitudinal movement therein. The opposite end of the spindle may be provided with a hand wheel. It is obvious that with such a belt shifter, extremely delicate adjustments may be made such as one revolution difference per hour. With an arrangement of this character, it is preferable to have a known relation between the pitch of the screw threads and the taper of the pulleys, so that the adjustment given by one revolution of the spindle 39 will produce a definitely known change between the speed of the motor and the shaft 22. To speed the entire paper machine up or down, the speed of the master motor would be changed, all the other motors keeping the same speed ratio as set by the cone pulleys and belts.

From the foregoing description it will be seen that the basic idea of the invention is the bringing together of a master shaft and a plurality of shafts driven individually by the motors to be controlled, and the provision of a regulator for each motor, so arranged that any relative movement between the master shaft and the motor driven shafts will cause operation of the regulator to correct the speed of the motor, tending to run out of its predetermined speed relation to the other motors. It will therefore be understood a number of changes, many necessitated by particular applications, which changes cannot be foreseen, may be made in the precise method of applying this basic principle without departing from the spirit of the invention.

Having thus described my invention, what I claim is:

1. In a paper making machine, means for controlling the speed or speed relationship of the various rolls comprising in combination with a motor and a master shaft driven by said motor, a series of shafts driven from said master shaft, a second series of shafts one for each of the first series and terminating adjacent each of the shafts of the first series, a motor driving each of the shafts of the second series, and adapted to operate the rolls, a speed changing device for each of said second series of shafts disposed between the shaft and the motor driving it, a series of differential gears disposed one between each shaft of the first series and the corresponding shaft of the second series, and a series of electrical regulators to control the speed of the motors driving the rolls one for each motor in circuit therewith and operated by the movement of the differential gear, for the purpose set forth.

2. In a paper making machine means for controlling the speed of a roll comprising in combination with a master motor and a master shaft driven by said master motor, a spur shaft driven by the master shaft, a motor adapted to drive the roll, a second spur shaft driven by said last mentioned motor and terminating adjacent the first spur shaft, a speed changing device interposed between said roll driving motor and the second spur shaft, a differential gear between the first and second spur shafts, and an electrical regulator for controlling the speed of the roll driving motor in circuit therewith and operated by the movement of the differential gear.

3. A device for regulating the speed of one motor by another comprising in combination with a pair of motors, an electric regulator for one of the motors operative by change in the speed relation of the motors and means for altering the speed relation of the motors without producing operation of the regulator such as will return the motors to the original speed relation.

4. A device for regulating the speed of one motor by another comprising in combination with a pair of motors, an electric regulator for one of the motors mechanically connected between the motors for operation by change in the speed relation of the motors and a change speed device between the regulated motor and the regulator whereby the speed relation of the motors may be varied.

5. Means for regulating a series of motors to maintain predetermined speed relation, comprising an electro-mechanical field regulator for each motor, a speed control element common to all motors, driving connections between the motors and regulators and between the regulators and control element whereby variation of the speed relation between any motor and the control element operates the regulator of that motor, and a change speed device between each motor and its regulator, whereby the speed relation of any motor to the control element may be altered.

6. Means for electro-mechanically regulating the speed of one motor by the speed of another motor to maintain predetermined speed relation, comprising a field resistance regulator for the motor to be regulated, driving connections between each of the motors and the regulator, and a speed changing device included in one of said driving connections.

7. Means for electro-mechanically regulating a series of motors to maintain predetermined speed relation comprising a field regulator for each motor, a speed control element common to all motors, a driving connection between the motors and regulators and between the regulators and control element, whereby variation of the speed relation between any motor and the control element operates the regulator of that motor, and a speed changing device included in one of the driving connections of each regulator.

In witness whereof, I have hereunto set my hand, in the presence of two witnesses.

FRANK G. WARBURTON.

Witnesses:
S. R. W. ALLEN,
G. M. MORELAND.